(12) United States Patent
Dages

(10) Patent No.: US 9,339,019 B2
(45) Date of Patent: May 17, 2016

(54) FISHING LURE DEVICE

(71) Applicant: Timothy A. Dages, Louisville, KY (US)

(72) Inventor: Timothy A. Dages, Louisville, KY (US)

(*) Notice: Subject to any disclaimer, the term of this patent is extended or adjusted under 35 U.S.C. 154(b) by 0 days.

(21) Appl. No.: 13/987,353

(22) Filed: Jul. 17, 2013

(65) Prior Publication Data
US 2015/0020432 A1   Jan. 22, 2015

(51) Int. Cl.
*A01K 85/00* (2006.01)
*A01K 85/16* (2006.01)

(52) U.S. Cl.
CPC ............... *A01K 85/00* (2013.01); *A01K 85/16* (2013.01)

(58) Field of Classification Search
USPC .............. 43/42.11, 42.12, 42.13, 42.39
See application file for complete search history.

(56) References Cited

U.S. PATENT DOCUMENTS

| | | | |
|---|---|---|---|
| 2,238,832 A | | 4/1941 | Thoren |
| 2,479,484 A | | 8/1949 | Fomas |
| 3,500,573 A | * | 3/1970 | Hudson ............... 43/42.11 |
| 3,673,726 A | | 7/1972 | LaMontagne |
| 3,757,450 A | | 9/1973 | Martinez et al. |
| 3,805,437 A | | 4/1974 | Harris |
| 3,828,463 A | * | 8/1974 | Perrin ................. 43/42.11 |
| 4,329,804 A | * | 5/1982 | Brown ................ 43/42.09 |
| 4,671,007 A | | 6/1987 | Stanczyk |
| 4,750,290 A | | 6/1988 | Renaud |
| 4,763,436 A | * | 8/1988 | Lindmeyer ............. 43/42.1 |
| 4,773,180 A | * | 9/1988 | Shimizu ............... 43/42.11 |
| 4,998,373 A | | 3/1991 | Braswell |
| 5,024,019 A | * | 6/1991 | Rust et al. ............. 43/42.31 |
| 5,605,004 A | * | 2/1997 | Boullt et al. ........... 43/42.13 |
| 5,887,379 A | * | 3/1999 | Lockhart ............... 43/42.13 |
| 6,155,000 A | | 12/2000 | Ravencroft |
| D471,951 S | | 3/2003 | Bowman ............... D22/129 |
| D493,508 S | | 7/2004 | Kierst ................. D22/129 |
| 7,059,080 B2 | | 6/2006 | Bendel |
| D583,009 S | | 12/2008 | Burnam ............... D22/129 |
| 2004/0003533 A1 | | 1/2004 | Larsen |
| 2005/0166444 A1 | | 8/2005 | Taylor |
| 2006/0112607 A1 | | 6/2006 | Snyder |
| 2010/0205848 A1 | | 8/2010 | Hughes |

* cited by examiner

*Primary Examiner* — David Parsley
(74) *Attorney, Agent, or Firm* — Carrithers Law Office, PLLC

(57) ABSTRACT

A fishing lure including a generally V-shaped frame with an eye at the vertex of the V, a hook fixed at each end of the V, a heavier weighted member encircling the junction of one of the hooks with one end of the V and a lighter weighted member encircling the junction of the other hook with the other end of the V. The hooks are rigidly connected to the ends of and are coplanar with the V. The lure is configured so that with a fishing line tethered to the eye, the heavier weight tends to remain at the bottom and cause the plain of the lure to remain vertical. With the lure in this position, the shanks of both hooks are about horizontal and the points are directly above the shanks.

2 Claims, 4 Drawing Sheets

US 9,339,019 B2

FISHING LURE DEVICE

REFERENCE TO RELATED APPLICATIONS

This application claims priority to U.S. Provisional Application Ser. No. 61/741,192 filed on Jul. 16, 2012 which is incorporated herein in its entirety.

TECHNICAL FIELD

The present invention relates to the field of fishing lures and more particularly to artificial lures, containing more than one bait and hook, which mimic live bait motion while moving through the water.

BACKGROUND OF THE INVENTION

Artificial lures often contain portions which resemble small fish, frogs, insects or worms. Such lures often include a spinning portion which reflects light in hopes that the flickering will also attract fish. The shape of such lures often leads to unnatural wobbling, spinning or jerking of the entire lure while moving thorough the water, which may tend to scare fish away.

Attempts at designs which encourage a more natural movement of the lure have included tail members which impart a wiggle as a lure moves through the water. Some designs which are exemplary of such attempts include a tail which extends outward from the body of the lure, a tail with a curved end defining a J-shape, or a tail which includes a forward canted wing piece which fluctuates as the bait is pulled forward and causes the bait to flutter. Other lures include a rigid, canted spoon or wall fixed near a front face of a lure and jutting forward out from the face causing the lure to zig-zag violently while moving through the water. Some examples include a plurality of body parts articulatingly linked together by eyelets or chain links. Still other examples comprise a spoon shaped body which either spins or darts about while being pulled through the water.

DESCRIPTION OF THE RELATED ART

U.S. Pat. No. 4,998,373 for DOUBLE HOOK LURE by Braswell issued on Mar. 12, 1991 teaches a lure with a planar wire frame with a forward eye and trailing hooks which can be fitted with various baits such as artificial worms, feathers, fish, and so on. Braswell includes a shiny spinner element and uses double hooks rather than single hooks which tend to catch more weeds and moss than single hook units. Braswell teaches non-similar baits on the hooks. The present invention uses similar or identical baits to mimic a 'school' appearance and does not include shiny spinning elements.

U.S. Pat. No. 3,673,726 for FISH LURE by La Montagne issued on Jul. 4, 1972 teaches a coplanar frame with an eye at one end and at the other end are two similar or identical baits but with treble hooks pivotally attached at the two ends of the frame. Treble hooks catch more weeds and moss when pulled through the water. The present invention contains two individual hooks rigidly attached, one to each end of a V-shaped wire frame.

U.S. Pat. No. 4,671,007 for FISHING LURE DEVICE by Stancyk issued on Jun. 9, 1987 teaches a V-shaped wire frame with an eye at the vertex with a hook and bait pivotally connected at each end of the V. The points of each hook face inward toward a center of the V-shaped frame. Stancyk provides for pivotally connected hooks unlike the present invention which contains a V-shaped frame with rigidly attached hooks.

U.S. Pat. No. 6,155,000 for RATTLE BAIT FISHING LURE by Raven croft issued on Dec. 5, 2000 teaches an approximately V-shaped frame with a eyelet for line attachment at the vertex of the V, a weighted hook and bait rigidly attached to the lower end of the V and a pivotally attached rattle bait at the top end of the V. This contrasts with the present invention which includes a rigidly connected hook at each end of the V-shaped lure.

SUMMARY OF THE INVENTION

In accordance with the present invention, there is provided a fishing lure frame comprising, consisting of, or consisting essentially of an approximately V-shaped member having an aperture formed at a vertex, a first leg and a second leg joined at the vertex, a first hook rigidly attached to the free end of the first leg and a second hook rigidly attached at the free end of the second leg. The first leg is about three-fourths as long as the second leg. The first hook is rigidly connected to a free end of the first leg so that a bend of the first hook is coplanar with the V-shaped member and a shank of the first hook extends approximately horizontally to the right from a free end of the first leg of the V-shaped member when the V-shaped member is positioned as an arrow pointing to the left with the first leg extending downward and to the right at an angle of about 30 to 40 degrees below the horizon. The second hook is rigidly connected to a free end of the second leg so that a bend of the second hook is coplanar with the V-shaped member and a shank of the second hook extends approximately horizontally to the right from a free end of the second leg of the V-shaped member when the V-shaped member is positioned as an arrow pointing to the left with the second leg extending upward and to the right at an angle of about 50 to 60 degrees above the horizon. A first weighted member encircles a junction of the first hook and the first leg, is tapered at the left end and has a neck at a right end. The neck encircles the left end of the shank. A rim extends radially outward from the neck. A second weighted member encircles the junction of the second hook and the second leg. The second weighted member is approximately 10 to 20 percent of the weight of the first weighted member.

It is an object of this invention to provide a fishing lure which mimics the movements and motion of live bait as the lure is pulled through the water.

It is an object of this invention to provide a fishing lure which is weighted and balanced in such a way as to maintain a smooth lifelike movement through the water.

It is an object of this invention to provide a fishing lure which includes a V-shaped frame with an eye at the vertex for connecting to a fishing line and two single hooks rigidly attached one at each end of the V-shaped frame.

It is an object of this invention to provide a fishing lure wherein the junction between the hook and one end of the V-shaped frame is encircled by a weight for the purpose of maintaining the V-shaped frame in a vertical orientation with the weighted hook at the bottom and the unweighted or slightly weighted hook at the top of the V-shaped frame while being pulled through the water.

It is an object of this invention to provide a fishing lure wherein the V-shaped frame with two single hooks rigidly attached one at each end of the V-shaped frame, includes two similar or identical fish shaped baits on each hook so that as the lure is pulled through the water, each bait has the same motion up and down or left to right due to the rigid connections of the hook to the frame, whereupon the synchronized motion or the two mimics the simultaneous movement of schools of fish.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Figure 1:
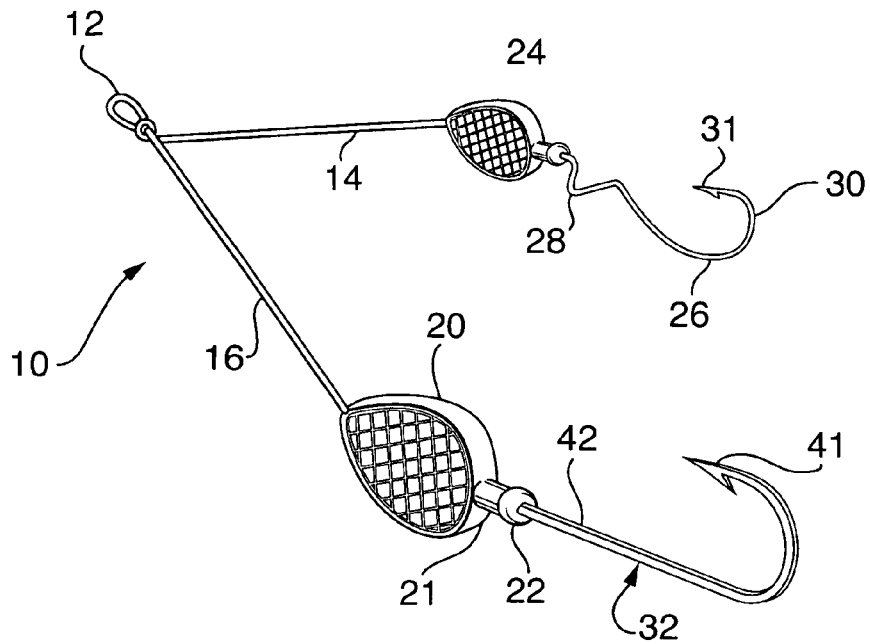
FIG. 1 is a left side view of the fishing lure frame.

A fishing lure frame 10, as best shown in FIG. 1, includes an approximately V-shaped element positioned as an arrow pointing to the left with the leg 16 extending downward and to the right at about 30 to 40 degrees below horizontal, with two hooks 26 and 32 rigidly attached one at each end of the legs 14 and 16 of the V-shaped portion. The hooks 26 and 32 are coplanar with the V-shaped element with both points pointing in the same direction. An eye 12 for attaching a fishing line is at the vertex of the V-shaped element.

Figure 4:
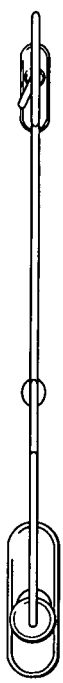
FIG. 4 is a rear view thereof.
Figure 5:
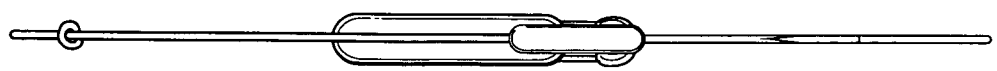
FIG. 5 is a plan top view thereof.
Figure 6:
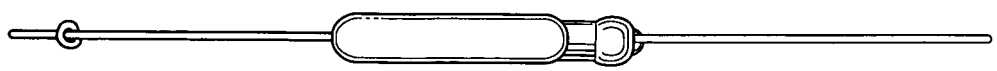
FIG. 6 is a plan bottom view thereof.
Figure 7:
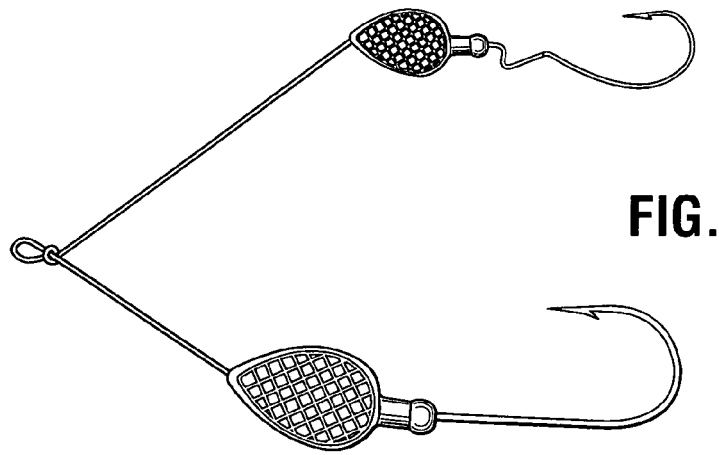
FIG. 7 is a left side view thereof.
Figure 8:
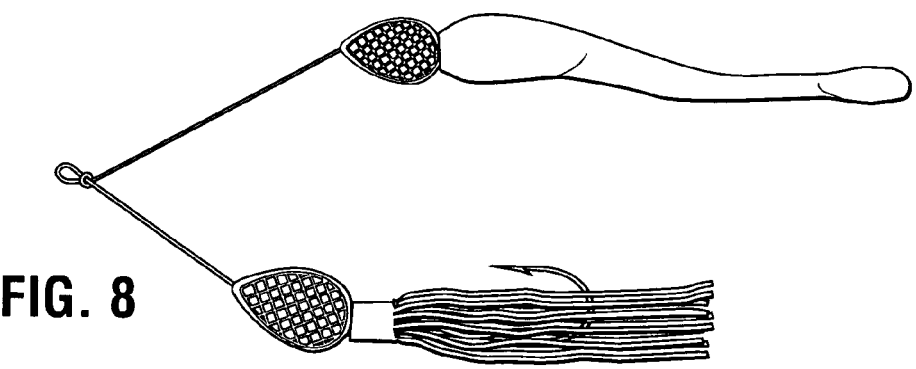
FIG. 8 is a left side view including a worm bait on the top hook and skirt covering the bottom hook.
Figure 9:
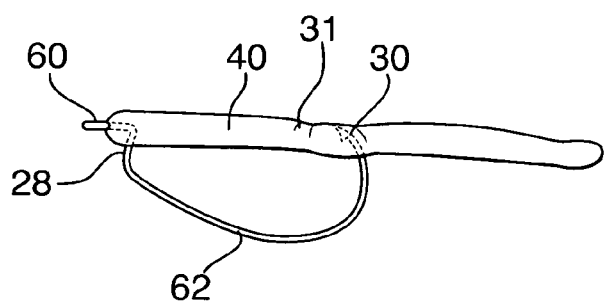
FIG. 9 is a left side view of the top hook of the fishing lure frame rigged for weedless and snag-less fishing
Figure 10:
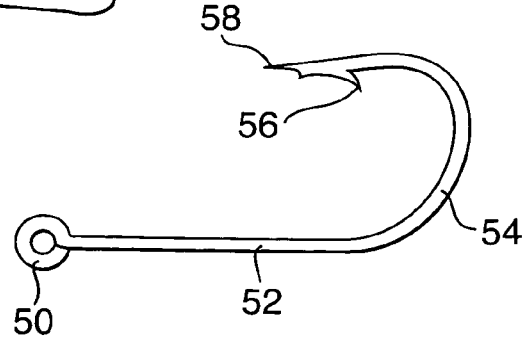
FIG. 10 is a shows a typical hook.

A fish hook known as a 'bait hook', shown in FIG. 4, includes an eye 50, a straight portion called a shank 52, a bend 54, a barb 56 and a point 58. The eye 50 provides a connection member to which a fishing line is tied. The barb 56 helps to hold the bait onto the hook and helps to hold the fish onto the hook once the fish has been hooked. Because the hooks 26 and 32 are rigidly attached to the legs 14 and 16, hooks 26 and 32 need not contain eyes. Hooks 26 and 32 are attached to legs 14 and 16 by welding, soldering, silver soldering, twisting together, or can be held together by the weighted members 24 and 20, respectively.

Figure 2:
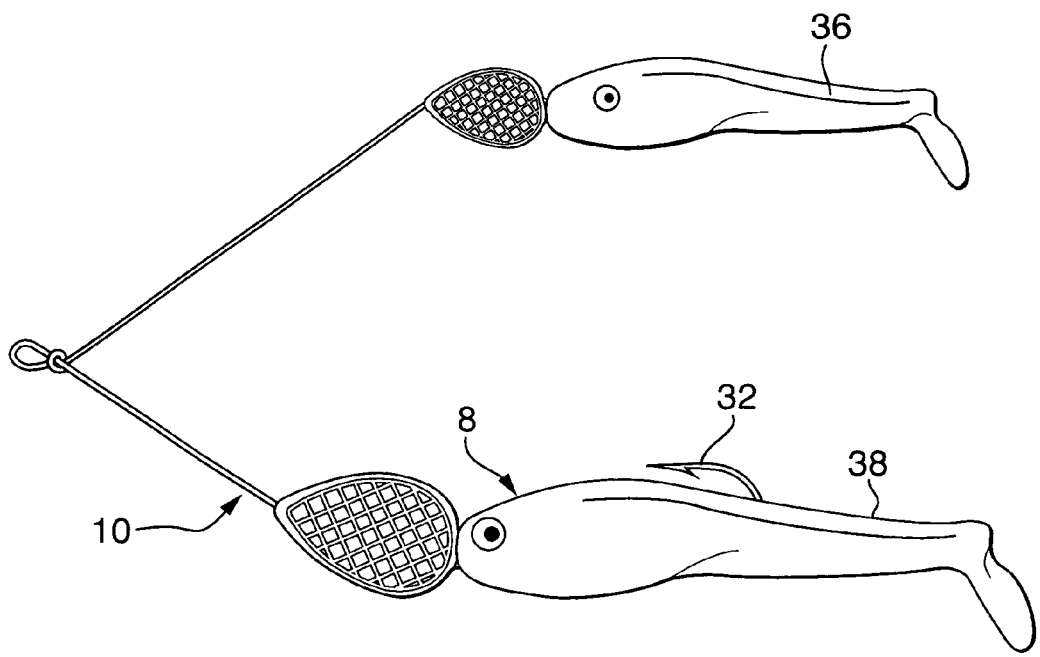
FIG. 2 is a left side view showing a minnow bait shown disposed on the top and bottom hooks of the fishing lure.

With reference to FIG. 1, leg 16 is about three-fourths as long as leg 14. The V-shaped element is shown vertical with the vertex pointing to the left. The hook 21 is oriented trailing to the right with the point 41 located above the shank. An approximately tear drop shaped weight 20 encircles the junction of the hook 32 and the leg 16. Weight 20 tapers to a point on the right end and includes a neck 21 which encircles the left most portion of the shank 42 of the hook 32. Further, a rim 22 extends radially outward from the free end of the neck 21. Rim 22 provides a tight fit when a bait such as an artificial night crawler, fish or worm for example is applied to the hook 32 and is pulled up over the rim 22, as shown in FIG. 2.

Figure 3:
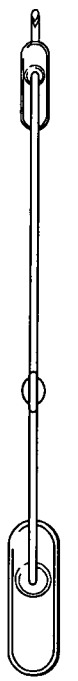
FIG. 3 is a front view thereof.

In FIG. 1, hook 26 is oriented with the point oriented above the shank, as well. Hook 32 is preferably a type of hook known as a 'bait hook', pictured also in FIG. 4. Conversely, hook 26 is preferably a type of hook known as a 'worm hook', which has an eye 60, a slight bend 28 near the eye, a curved shank 62, a bend, a barb and a point. This slight bend 28 allows for 'Texas-rigging' as shown in FIG. 3. With reference to FIG. 3, one end of the worm 40 is impaled over the point of the hook and is placed over the bend 28, a lower portion of the worm 40 is also impaled over the point 31 so that worm 40 covers the point 31, barb and a portion of the bend.

With reference to FIG. 1, as the fishing lure frame 10 is pulled through the water, hook 32 is guarded from snagging weeds and moss because leg 16 will encounter and prevent weeds from being hooked by hook 32. However, hook 26 extends upward level with or slightly above the top end of leg 14. As the frame 10 is pulled through the water, any weeds which are encountered by leg 14 will slide upward toward hook 26 and likely become snagged. Therefore, hook 26 is preferably a 'worm hook' which allows for Texas rigging, as explained above, to prevent snagging.

A weight 24, which weighs about ten to twenty percent as much as weight 20, encircles the junction of hook 26 and leg 14. Weight 20 is substantially heavier than weight 2, causing hook 32 to mostly remain at the bottom and hook 26 to remain mostly at the top as the lure is pulled through the water. Depending on the relative size and weight of the frame 10, weight 20 ranges in weight from one-fourth to one ounce.

A complete fishing lure 8, shown in FIG. 2, includes frame 10 and two selected baits shown as a top minnow 36 and bottom minnow 38 are applied to the hooks 32 and 26. Elastomeric baits such as artificial worms, fish, tadpoles, various insects, feathers, skirts and the like are applied to hooks 26 and 32 of frame 10 to form a complete lure. Preferably, the bait that is applied to hook 26 is Texas-rigged to render the lure 'weedless' or snag-less.

It is thought that the nature of the rigid attachment of the hooks to the fishing lure frame 10 provides a smooth lifelike schooling image to fish in that, as the lure is pulled through the water, the leading ends, usually the heads, of the baits move simultaneously and always in the same direction, thus imparting a synchronized motion to the rest of the bodies of the baits. This synchronized motion of the baits generally mimics the movement of a school of fish, notwithstanding, a small school of two.

Figure 11:
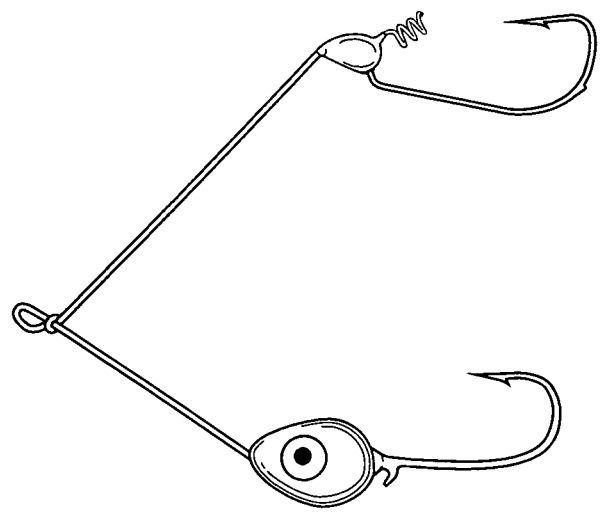
FIG. 11 is a left side view showing a spiral keeper extending above the forward portion of the hook shank in line with the point whereby the bait can be screwed onto the keeper.
Figure 12:
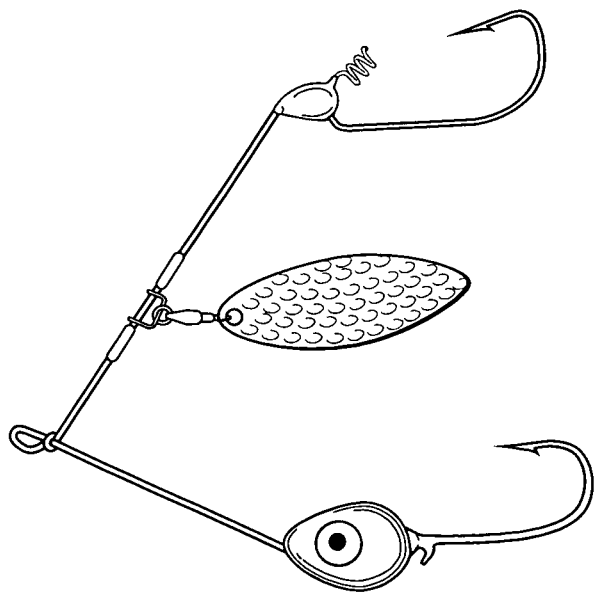
FIG. 12 is a left side view showing a spinner bait disposed between the top and bottom hooks mounted on a loop held in position by a holding means comprising a top and bottom sleeve.

FIG. 11 is a left side view showing a spiral keeper extending above the forward portion of the hook shank in line with the point whereby the bait can be screwed onto the keeper. FIG. 12 is a left side view showing a spinner bait disposed between the top and bottom hooks mounted on a loop held in position by a holding means comprising a top and bottom sleeve. The position of the spinner on the leg is important to maintain proper balance and spin.

In the preferred embodiment, the V-shaped member having an aperture formed at a vertex, a first leg and a second leg joined at the vertex, a first hook rigidly attached to the free end of the first leg and a second hook rigidly attached at the free end of the second leg. The first leg is about three-fourths as long as the second leg. The first hook is rigidly connected to a free end of the first leg so that a bend of the first hook is coplanar with the V-shaped member and a shank of the first hook extends approximately horizontally to the right from a free end of the first leg of the V-shaped member when the V-shaped member is positioned as an arrow pointing to the left with the first leg extending downward and to the right at an angle of about 30 to 40 degrees below the horizon. The second hook is rigidly connected to a free end of the second leg so that a bend of the second hook is coplanar with the V-shaped member and a shank of the second hook extends approximately horizontally to the right from a free end of the second leg of the V-shaped member when the V-shaped member is positioned as an arrow pointing to the left with the second leg extending upward and to the right at an angle of about 50 to 60 degrees above the horizon. Basically, the angle between the first leg and the second leg is preferably from 45 to 135 degrees, more preferably between 120 and 60 degrees, more preferably between 70 and 90 degrees and most preferably about 80 degrees. A first weighted member encircles a junction of the first hook and the first leg, is tapered at the left end and has a neck at a right end. The neck encircles the left end of the shank. A rim extends radially outward from the neck. A second weighted member encircles the junction of the second hook and the second leg. The second weighted member is approximately 10 to 20 percent of the weight of the first weighted member.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A fishing lure consisting of:
   an approximately V-shaped member having an eyelet including an aperture formed at a vertex of said V-shaped member, said V-shaped member having a first leg and a second leg joined at said vertex, said first leg being about three-fourths as long as said second leg;
   said eyelet, said first leg and said second leg are integral with one another and said eyelet comprises a loop extending from a selected point at a proximate end of said first leg wherein said proximate end of said second leg wraps around said first leg at least one revolution forming said loop;
   a first hook being rigidly connected to a free end of said first leg so that a bend of said first hook is coplanar with said V-shaped member and a shank of said first hook extends approximately horizontally to the right from a free end of said first leg of said V-shaped member when said V-shaped member is positioned as an arrow pointing to the left with said first leg extending downward and to the right at an angle of about 30 to 40 degrees below the horizon, said first hook including a bait selected from the group consisting of an elastomeric worm, a fish, a tadpoles, an insect, a feather, a skirt, and combinations thereof;
   a second hook being rigidly connected to a free end of said second leg so that a bend of said second hook is coplanar with said V-shaped member and a shank of said second hook extends approximately horizontally to the right from a free end of said second leg of said V-shaped member when said V-shaped member is positioned as an arrow pointing to the left with said second leg extending upward and to the right at an angle of about 50 to 60 degrees above the horizon at a selected acute angle with respect to said first leg, said second hook including a bait selected from the group consisting of an elastomeric worm, a fish, a tadpoles, an insect, a feather, a skirt, and combinations thereof;
   a first weighted member encircling a junction of said first hook and said first leg, said first weighted member being tapered at a left end and having a neck at a right end, said neck encircling a left end of said shank, a left end of said neck having a rim extending radially outward from said neck;
   a second weighted member encircling a junction of said second hook and said second leg, said second weighted member having 10 to 20 percent less weight than said first weighted member; and
   said second weighted member positioned above and behind said first weighted member.

2. A fishing lure consisting of:
   an approximately V-shaped member having eyelet including an aperture formed at a vertex of said V-shaped member, said V-shaped member having a first leg and a second leg joined at said vertex, said first leg being about three-fourths as long as said second leg;
   said eyelet, said first leg and said second leg are integral with one another and said eyelet comprises a loop extending from a selected point at a proximate end of said first leg wherein said proximate end of said second leg wraps around said first leg at least one revolution forming said loop;
   a first hook being rigidly connected to a free end of said first leg so that a bend of said first hook is coplanar with said V-shaped member and a shank of said first hook extends approximately horizontally to the right from a free end of said first leg of said V-shaped member when said V-shaped member is positioned as an arrow pointing to the left with said first leg extending downward at a selected angle below the horizon;
   a second hook being rigidly connected to a free end of said second leg so that a bend of said second hook is coplanar with said V-shaped member and a shank of said second hook extends above said first leg of said V-shaped member when said V-shaped member is positioned as an arrow pointing to the left with said second leg extending upward at a selected acute angle with respect to said first leg;
   a first weighted member extending from said first leg including a first keeper mounting at a selected position at the end of said first leg and adjacent the proximate end of said shank of said first hook;
   a second weighted member extending from said second leg including a second keeper extending therefrom mounting at a selected position at the end of said second leg and adjacent the proximate end of said shank of said second hook;
   said second weighted member having 10 to 20% less weight than said first weighted member; and
   said second weighted member positioned above and behind said first weighted member.

* * * * *